W. A. BAGLEY.
Hold-Back.
No. 70,938.
Patented Nov. 19, 1867.
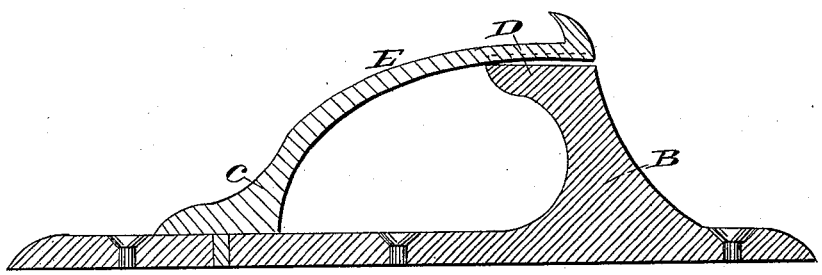
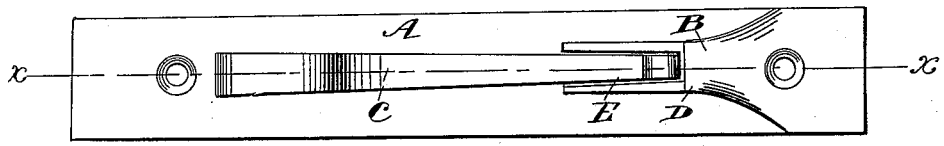
Witnesses
Theo Tusche
Wm Trewrn
Inventor
W. A. Bagley
Per Munn & Co
Attorneys

United States Patent Office.

WILLIAM A. BAGLEY, OF ANSONIA, CONNECTICUT.

Letters Patent No. 70,938, dated November 19, 1867.

IMPROVEMENT IN HOOKS FOR HOLD-BACK STRAPS.

*The Schedule referred to in these Letters Patent and making part of the same.*

TO ALL WHOM IT MAY CONCERN:

Be it known that I, WILLIAM A. BAGLEY, of Ansonia, in the county of New Haven, and State of Connecticut, have invented a new and useful Improvement in Hooks for Hold-Back Straps; and I do hereby declare that the following is a full, clear, and exact description thereof, which will enable others skilled in the art to make and use the same, reference being had to the accompanying drawings, and to the letters of reference marked thereon.

Figure 1 is a plan or top view of the hook, and

Figure 2 a central longitudinal vertical section, taken in the plane of the line $x\ x$, fig. 1.

The hold-back hook embraced in the present invention, is constructed in two parts or sections, one of which is fixed to the shaft, and the other arranged to swing thereon, so as to open or close the same, it being made with a spring, so as to fasten itself to the fixed part, when brought over the same.

A, in the drawings, represents a plate, carrying the two parts B and C of the hold-back hook, embraced in the present invention. The part B is fixed to the plate, in the form of a post, flattened and grooved at its upper end D, to receive the end E to the other part C, that is arranged to swing upon the said plate A, and is made with a spring, so as to set and fix itself therein, when swung over it.

The mode of operating the hook is obvious, without any particular description herein.

Having thus described my invention, I claim as new, and desire to secure by Letters Patent—

A hook for hold-back straps, made in two parts, B and pivoted part C, substantially as described.

WILLIAM A. BAGLEY.

Witnesses:
JOHN MARTIN,
ALEXANDER HARPER.